Patented May 24, 1938

2,118,405

UNITED STATES PATENT OFFICE 2,118,405

METHOD OF SECURING CONCENTRATED FOOD PRODUCTS FROM BANANAS

Stephen A. Karas, Forest Hills, N. Y.

No Drawing. Application December 11, 1934, Serial No. 756,973

11 Claims. (Cl. 99—100)

The present invention relates to processes for the treatments of bananas for the preparation of concentrated food products therefrom and to the resulting food products. It will be fully understood from the following description, wherein specific details of a process and of products embodying the invention are set forth.

In the preparation of concentrated food products from ripe bananas, great difficulties are presented by the physical characteristics of their pulp, which is mucilaginous or almost slimy in character, offers great difficulties in handling, mixing with solvents, and filtration; and by the chemical characteristics arising from the tendency of the ripe pulp to discolor rapidly, and of its susceptibility to enzyme action and to fermentation. The present invention overcomes these difficulties and by its use there may be secured from ripe bananas, in concentrated form, a syrup-like material consisting largely of sugars and soluble extractives from the bananas and a light-colored solid material containing starches, fats, minerals and other undissolved constituents of the banana. This light colored solid material may be ground to flour-like form to provide a banana meal.

In carrying out the process of the present invention, the pulp of ripe bananas is mashed thoroughly and immediately mixed with alcohol, the alcohol being added as soon as practicable so as to prevent fermentation or discoloration. While any low-molecular, water-soluble alcohol such as methyl alcohol, ethyl alcohol, isopropyl or normal propyl alcohol may be used in carrying out the invention, it is preferred to employ pure ethyl alcohol, suitably the commercial grade (about 95%).

The proportion of alcohol which is employed may be varied somewhat, depending upon relative proportions of solids and of water in the banana pulp. In general, an amount of alcohol approximately equal to the amount of water present in the pulp is employed, although somewhat more or somewhat less may be employed. The proportion of alcohol employed is such that, on thorough mixing with the pulp, the latter loses its mucilaginous or gummy characteristics and the particles of pulp become comparatively rough and granular. In general, the amount of alcohol required to secure the desired solvent action and change in texture of the banana pulp is at least from 40 to 60% by weight of the quantity of water naturally present in the pulp and preferably at least 75% thereof. As hereinbefore stated, it is preferred to employ an amount of alcohol approximately equal to the amount of water naturally present in the pulp although more, say up to a 50% excess, may be used, if desired.

In mixing the alcohol with the pulp, ordinary room temperatures may be used. It has been found, however, that by using temperatures up to about 35° C. better flavored syrups or concentrated soluble extractives may be secured while at lower temperatures, say in the order of 15° C., a better flour product or concentrated insoluble extractive product may be secured.

The mixing of the pulp and the alcohol is preferably conducted in a tight receptacle, without access of air, the receptacle being preferably glass or enamel lined, although non-corrodible metals may be used. By preventing access of air and employing suitable receptacles, darkening action and enzyme action may be prevented and a white flour product (insoluble extractives) more readily secured. In the mixing of the alcohol and pulp, the latter loses entirely its slippery and mucilaginous character and the insoluble products are readily filtrable from the soluble extractives.

As a specific example, illustrative of the invention, the skins are removed from about 150 lbs. of ripe bananas, leaving about 100 lbs. of pulp. This is finely mashed, and immediately mixed with 12 to 14 gallons of 95% alcohol. The pulp and alcohol are thoroughly mixed for a sufficient period, say 4 to 6 hours, at a temperature of from 15° C. to 35° C., preferably in a tightly closed, glass-lined receptacle without access of air.

In further carying out the invention, the clear liquid resulting from the thorough admixture of the alcohol and banana pulp under the conditions hereinbefore set forth is filtered off and concentrated to effect removal of the alcohol. During the removal of the alcohol, the concentrated liquid may become cloudy and when this occurs, it may again be filtered before further concentration is effected. Any residue of the alcohol and also of the water are then removed by evaporation either under ordinary pressure or at reduced pressure. Preferably, the removal of the water and alcohol is effected at such reduced pressure that a temperature not over 50 to 60° C. is required for the concentration, so that caramelization of the resulting syrupy product does not take place. When the specific gravity of the liquid becomes about 1.50, evaporation of alcohol and water is practically completed. This product comprises essentially the sugars contained in the original banana in syrup form and consists largely of invert sugars. If not overheated and caramelized, it has a strong, pleasant and characteristic odor, is clear, slightly amber colored, viscous and sweet. An average yield from 100 lbs. of ripe pulp is 13 to 17 lbs.

The separated, insoluble pulp constituents from which the alcoholic solution of sugars and other soluble extractives has been removed and which has been retained on the filters and filter press as a filter cake, is broken up into pieces of suitable size and dried on supports which will not cause darkening of the insoluble extractives. Wood, glass or enameled supports may be used for this purpose, as may some metals, such as Monel metal and non-corrodible nickel and chromium alloys. Drying is suitably effected at a temperature of 50 to 75° C., the lower temperatures being employed when it is desired to preserve the enzymes present and the higher temperatures being employed when it is desired to destroy the enzymes present or certain of them. After drying, which may require from 3 to 5 hours, the insoluble extractives or pulps may be milled to form a flour or meal of any degree of fineness. This flour is of a sweetish taste and has a pleasant, strong, characteristic odor. When produced with proper control as hereinbefore set forth, it is of light color, and comprises starches, mineral constituents, vitamins and fats present in the original banana pulp. From 4 to 6 lbs. of this product are secured from 100 lbs. of original banana pulp.

The products derived as hereinbefore set forth, are stable and do not require the addition of preserving agents.

While the present invention has been set forth in connection with specific details of the process for carrying out the same, it is to be understood that these details are not to be regarded as limitations upon the scope of the invention, except as set forth in the accompanying claims.

I claim:

1. The method of producing concentrated food products from bananas which comprises thoroughly mixing the pulp of ripe bananas with alcohol, separating the resulting solution from the undissolved banana constituents and separately drying the alcoholic solution and the undissolved constituents.

2. In the method of producing concentrated food products from bananas, thoroughly mixing the pulp of ripe bananas with alcohol in amount at least 40 to 60% by weight of the amount of water present in the pulp, thereby converting undissolved constituents thereof into non-mucilaginous, filtrable form.

3. The method of producing concentrated food products from bananas which comprises thoroughly mixing pulp of ripe bananas with alcohol, the proportion of the latter being at least 40 to 60% of the water present in said pulp, separating the resulting solution from the undissolved banana constituents and separately drying the solution and the undissolved constituents.

4. The method of producing concentrated food products from bananas which comprises thoroughly mixing the pulp of ripe bananas with alcohol, the latter being in amount at least 75% by weight of the amount of water present in said pulp, maintaining a temperature not above 35° C. during said mixing, and separating the resulting solution from the undissolved banana constituents.

5. The method of producing concentrated food products from bananas which comprises thoroughly mixing the pulp of ripe bananas with alcohol, the latter being in amount at least 75% by weight of the amount of water present in said pulp, maintaining a temperature not above 35° C. during said mixing, separating the resulting solution from the undissolved banana constituents, and separately drying the resulting solution and the undissolved constituents.

6. The method of producing concentrated food products from bananas which comprises thoroughly mixing the pulp of ripe bananas with alcohol at a temperature not over 35° C. in a closed container without access of air, separating the resulting alcoholic solution and removing the alcohol and water therefrom, thereby forming a syrup containing sugars present in the bananas.

7. The method of producing concentrated food products from bananas which comprises thoroughly mixing the pulp of ripe bananas with alcohol, the latter being present in amount at least 40 to 60% by weight of the amount of water present in said pulp, maintaining a temperature between 15° to 35° C. during said mixing and separately drying the resulting solution and the undissolved constituents.

8. In the method of producing a ripe banana meal free from substantial amounts of the sugars normally present in ripe bananas, the step consisting of mixing a low-molecular weight water-soluble alcohol with a slippery, mucilaginous pulp of ripe bananas.

9. In the method of producing a ripe banana meal free from substantial amounts of the sugars normally present in ripe bananas, the steps consisting of mixing a low-molecular weight water-soluble alcohol with a slippery, mucilaginous pulp of ripe bananas, removing the alcohol with its extracted material and drying the residue, at a temperature between 50 to 75° C.

10. A stable, non-caramelized, clear, slightly amber colored viscous and edible syrup, substantially water free and containing extractives derived from ripe bananas, said syrup consisting largely of the sugars of ripe bananas, and containing reducing and non-reducing sugars in substantially similar proportions to those found in ripe bananas, together with the mineral and non-carbohydrate alcohol-soluble constituents of ripe bananas, said syrup being substantially free from pectins and starch.

11. A stable, solid, concentrated low-protein content banana meal derived from ripe bananas and having a sweet taste and a substantially reduced amount of the sugars normally present in the ripe bananas, said meal being the dried residue resulting from an alcoholic extraction of a ripe banana mash, and being further characterized by its insolubility in an aqueous alcoholic solution having an alcoholic content of about 60% by weight or higher and by its content of alcohol-insoluble mineral constituents found in fresh ripe bananas.

STEPHEN A. KARAS.